United States Patent [19]
Kratavil

[11] 3,831,085
[45] Aug. 20, 1974

[54] REACTOR VESSEL LINING TESTING METHOD AND APPARATUS

[75] Inventor: Allan Jerome Kratavil, Wayne, N.J.

[73] Assignee: Hoffmann-La Roche Inc., Nutley, N.J.

[22] Filed: Apr. 12, 1973

[21] Appl. No.: 350,554

[52] U.S. Cl. .................................. 324/54, 324/29
[51] Int. Cl. ...................... G01r 31/12, G01n 27/20
[58] Field of Search ............ 324/29, 30, 54; 204/1 T

[56] References Cited
UNITED STATES PATENTS

| | | | |
|---|---|---|---|
| 2,497,052 | 2/1970 | Williams | 324/30 X |
| 3,259,840 | 7/1966 | Schaschl et al. | 324/29 |
| 3,551,801 | 12/1970 | Wood et al. | 324/29 |
| 3,555,414 | 1/1971 | Deichelmann | 324/54 |
| 3,719,884 | 3/1973 | LaRoche | 324/54 |

FOREIGN PATENTS OR APPLICATIONS

D1,912,697 10/1964 Germany

*Primary Examiner*—Gerard R. Strecker
*Attorney, Agent, or Firm*—Samuel L. Welt; Jon S. Saxe; George M. Gould

[57] ABSTRACT

Protectively lined reactor vessels may be monitored for lining damage by measuring the potential which develops between a tantalum reference electrode and any exposed steel resulting from lining damage. The reference electrode is preferably tantalum which is insulated in part to insure that it is not grounded to the vessel. The reference electrode is connected to a voltmeter which in turn is connected to the conductive reactor body to complete the passive DC electrical circuit. A background potential is normally observed even in a vessel having no lining damage. The presence of damage in the lining causes a substantial increase in the observed potential.

7 Claims, 1 Drawing Figure

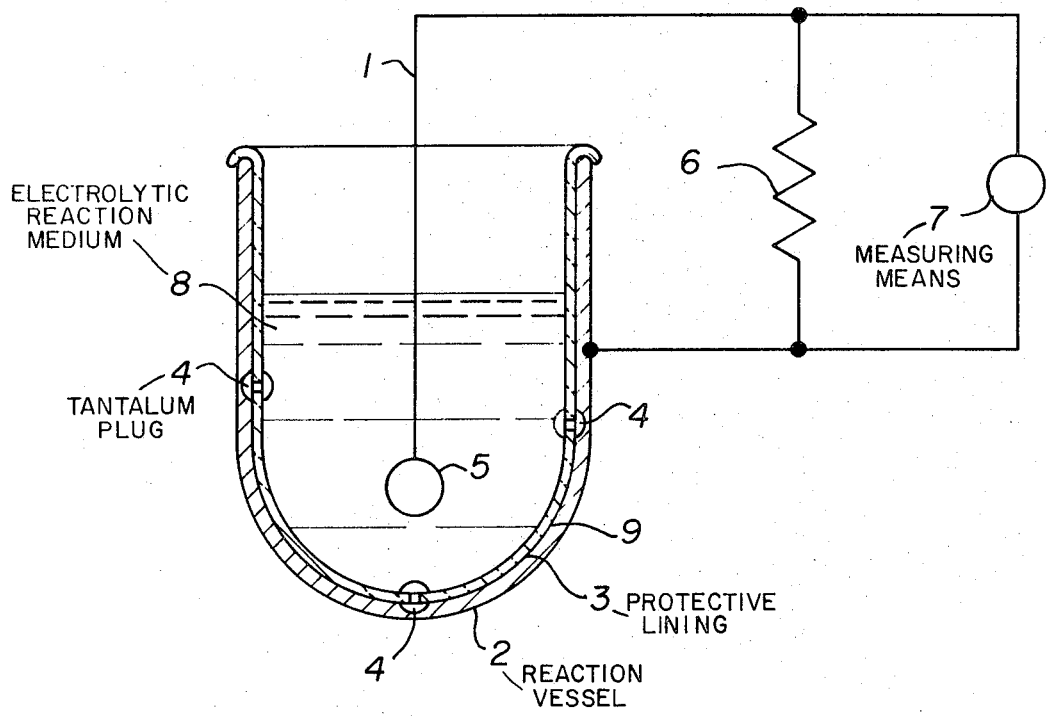

REACTOR VESSEL LINING TESTING METHOD AND APPARATUS

BACKGROUND OF THE INVENTION

A method and apparatus useful in detecting faults in the enamel lining of reaction vessels is described in U.S. Pat. No. 3,555,414. Such method and apparatus employs an exposed, metallic electrode within the vessel which is connected to the negative terminal of an electrical direct current source which includes a current sensitive relay. The metal wall of the vessel is connected to the positive terminal of the direct current source. When a low direct current voltage is applied to the circuit with a conductive material within the vessel, the magnitude of current produced is an indicator of the presence of lining damage in the vessel.

However, the aforesaid method and apparatus does have certain disadvantages. Thus, it would be necessary in this system to ensure that all tantalum plugs in the vessel are passivated prior to monitoring for lining damage. This involves imposing the DC potential with proper polarity on the vessel for a sufficient time to form the passivating layer on the plugs by anodic oxidation. In addition this system requires a continuous source of direct current in order to operate. Most importantly such passivation is not readily obtainable in certain media such as HBr.

BRIEF SUMMARY OF THE INVENTION

Failures in the protective lining of reactive vessels used in the chemical and allied industries can be detected by an improved system employing electrochemical measurements. The external steel shell of the vessel acts as one electrode, while a suitable reference electrode within the electrolytic process fluid in the vessel completes the cell. In this manner continuous circuit parameter measurements such as potential or current can be obtained continuously while the process vessel is in service. It is further possible utilizing this apparatus and method to monitor vessels equipped with conductive, corrosion-resistant (tantalum) plugs through the lining by proper selection of the reference electrode. Circuit parameter measurements can be made with conventional measuring equipment, e.g., millivolt meters, optionally utilizing a shunt to achieve desired results.

DESCRIPTION OF THE INVENTION

In chemical processing it is often necessary to utilize vessels made of conductive structural material such as steel to which a suitable non-conductive protective lining such as glass, enamel, plastic, rubber or the like is applied for corrosion resistance. These lined vessels are well suited to handling a wide variety of materials which would be highly corrosive if brought in contact with the underlying structural material. Thus it is of extreme value to the chemical process industry to be able to determine when the protective lining has been damaged so as to expose the underlying structural element. This knowledge will allow the vessel to be removed from service and repaired before non-repairable, extensive damage is done to the expensive process vessel.

The method and apparatus of the present invention provides a system wherein a protectively lined reaction vessel is continuously monitored for the presence of a break in the protective lining without the need to utilize an external power source. The signal utilized is derived from the "battery type" electrochemical cell using the reactor vessel itself. All that is required is a suitable reference electrode and an external DC circuit connected to a meter for measuring the desired circuit parameters, i.e., voltage or current. It is within the skill of the art to also employ in conjunction with the circuit parameter measuring device conventional alarm systems and/or relay actuated controls.

The reference electrodes used should be of suitable construction to withstand exposure to the reaction medium employed in the lined vessel. Suitable electrodes would provide a detectable current or voltage in conjunction with the detecting instrument used. For the practice of the present invention it is possible to employ metal electrodes which are known to be corrosion resistant in electrolytic media and which are extremely sound. Such electrodes can be fabricated from platinum, tantalum, silver, palladium, rhodium or alloys thereof. Tantalum and platinum are metals of choice in the electrodes of the instant invention.

As a circuit parameter measuring device it is generally convenient to utilize a millivolt meter of 10 or 11 meg ohm input impedance, particularly when utilizing tantalum electrodes. In those cases where a high input impedance meter is used such as pH measuring equipment, it is generally convenient to provide a shunt resistor across the input terminals to keep the meter from producing erratic measurements. Reasonable value for this resistor is 250,000 ohms but significant readings are obtainable using other resistor values. For other electrode materials, i.e., platinum, etc. other shunt values will be used and it is within the skill of the art to select such values so as to provide meaningful readings from the measuring device.

The exact method of installation and form of the reference electrode are not broadly critical to the practice of the invention. It is convenient, for example, to provide the electrode in the form of a wire strapped to the vessel baffle which is passed through the packing stuffing box. It is only necessary that the wire electrode is not grounded and that it interfaces with the reaction fluid in vessel.

It is also possible to attach the electrode wire to an insulated tantalum stud or full gasketed blank flange to provide the contact for the meter leads. In some instances tantalum studs on the baffle arms may be used when the baffle is insulated from the reactor shell. However, in such cases the baffle itself will not be monitored for possible breakage of the protective lining.

It is further possible to utilize tantalum or platinum button electrode wherein the lead to the button is encased within the protective lining of the vessel, i.e., particularly when glass is employed. Such system is also suitable for baffle installation.

The circuit is completed by connecting the other terminal of the circuit parameter monitoring device to the conductive structural material of the vessel such as the steel jacket.

In normal operation in plant equipment a background signal is observed while the lining is intact. The level of the signal is dependent on the nature of the reference electrode and the input meter resistance. The existence of this background signal is valuable since it demonstrates that the monitoring device is functioning and that a ground or instrument failure has not occurred. In the event that lining failure occurs within the vessel the observed signal will change substantially to reach a predetermined level. This lining breakage level is readily determined for any combination of electrode material and reaction medium by testing a sound vessel containing such electrode and reaction medium with the system of the present invention by substituting an appropriate rod made of the same material as the conductive structural element forming the vessel jacket for the second lead and inserting such rod within the reaction medium. The voltage or ground observed in such test would correspond to a failure of the lining in the aforesaid system.

The apparatus and method of the present invention will be more clearly understood by reference to the drawing wherein a schematic representation of the system of the present invention is depicted. In the drawing a conductive wire lead 1 serves to connect one terminal of the circuit parameter measuring means 7 with the metal electrode element 5. The other terminal of the measuring means 7 is connected to the conductive jacket of reactive vessel 2. The reactive vessel can contain a plurality of tantalum plugs 4 which are inserted through the protective lining 3 surrounding the inner surface of reactive vessel 2.

The reactive vessel contains a suitable electrolytic reaction medium 8 and element 5 is seen to extend below the surface level of this medium.

In the instances previously described it may be necessary to employ a resistor shunt 6 across the terminals of measuring means 7.

When a break in the protective lining 3 of the reaction vessel 2 occurs such as depicted by 9, a metal-metal couple between the electrode element 5 and the jacket 2 is formed. The existence of this couple is manifested by a corresponding change in the circuit parameters measured by meter 7.

The apparatus and method of the present invention was tested under regular chemical processing conditions. Thus a 2,000 gallon glass lined steel reaction vessel equipment with a tantalum reference electrode as described above and containing several tantalum plugs was connected to a millivolt voltage meter of about 11 megohms input impedance. The reaction vessel contains a reaction media comprising 48% HBr at reflux. The variable background mv range was observed on the reactor with a maximum value of about 400 mv at the conditions in question.

Prior laboratory studies utilizing a tantalum steel electrode couple at the indicated reaction conditions to simulate failure indicated that the failure voltage would be in the range of about 700–800 mv.

When the test vessel was observed to give mv readings in the range of about 700–800 mv the vessel was taken out of service.

Inspection of this vessel utilizing conventional techniques confirmed the presence of a failure in the protective lining of the vessel.

I claim:

1. A protective lining fault detecting system useful in conjunction with a reaction vessel provided with one or more tantalum plugs and having a non-conductive, protective lining which vessel contains a corrosive electrolytic reaction medium and having external structural walls formed of electrically conductive materials said system comprising:

a metallic, corrosion resistant electrode means insulatedly mounted within said vessel and in conductive contact with said medium;

a passive electrical DC circuit comprising circuit parameter measuring means having one terminal connected to said electrode and the other terminal to the electrically conductive walls of said vessel; wherein a fault within said protective lining results in a substantial change in the circuit parameters measured by said circuit parameter measuring means.

2. The apparatus of claim 1 wherein said metal electrode means comprises a tantalum electrode and said circuit parameter measuring means comprises a millivolt meter.

3. The apparatus of claim 1 wherein a resistor shunt is employed across asid terminals.

4. A method of determining faults during operation in a non-conductive protective lining of a reaction vessel provided with one or more tantalum plugs and having structural outer walls of electrically conductive materials wherein said reaction vessel contains a corrosive electrolytic reaction medium which method comprises:

introducing an insulated metallic, corrosion resistant electrode into the interior of said vessel and into conductive contact with, said medium;

providing a passive electrical DC circuit between said electrode and the electrically conductive walls of said vessel and monitoring changes in the circuit parameters within said passive electrical DC circuit.

5. The method of claim 4 wherein said metallic electrode is a tantalum electrode.

6. The method of claim 4 wherein said electrolytic reaction medium comprises a strong mineral acid.

7. The method of claim 4 wherein said circuit parameter being monitored is the voltage between said metallic electrode and said electrically conductive walls of said vessel.

* * * * *